United States Patent Office 2,893,881
Patented July 7, 1959

2,893,881

IMPREGNATING COMPOSITION

Songe S. Sakornbut, Kirkwood, Mo., assignor to Monsanto Chemical Company, St. Louis, Mo., a corporation of Delaware No Drawing. Application June 1, 1954
Serial No. 433,834

19 Claims. (Cl. 106—15)

This invention relates to the art of preserving cellulose compositions. More specifically, the invention is directed to a composition of matter useful in preventing insect and fungal attack on wood, paper and other cellulosic products, and improving the weather resistance thereof.

It is well known that pentachlorophenol and other chlorinated phenols are preservatives for wood and similar cellulosic materials. Being toxic to most forms of life, the chlorinated phenols inhibit the normal life processes of various destructive organisms, such as wood borers and fungi. The conventional use of chlorinated phenols in combination with chlorinated hydrocarbons involves the dissolution of the mixture in a suitable solvent and application to the product to be treated by brushing, spraying, immersion or impregnation with pressure and/or vacuum. Although such treatments render the treated materials less combustible, it is often difficult to establish a substantial proportion of the chlorinated phenol and chlorinated hydrocarbon mixture within the interstices of the porous cellulosic product. Also the chlorinated phenol crystallizes on the surface of the product, which phenomenon is known as "blooming." Although the treated cellulosic products of the prior art are more resistant to fire than the untreated products, they are not fireproof, being capable of burning in the presence of other combustible substances. They are also subject to slow combustion, known as "glowing," and as a result be completely consumed.

It is the fundamental purpose of this invention to provide an impregnating preservative by the use of which a substantial portion of chlorinated phenols may be incorporated within the treated product. A further purpose of the invention is to provide an impregnating preservative which renders the treated product both flameproof and glow-proof. A still further purpose of this invention is to provide a preservative for wood and other porous cellulosic material which is not subject to the loss of active toxicant due to blooming and which will retain a substantial quantity of the chlorinated phenol in a hydrophobic state which cannot be removed by normal weathering action. Further purposes of this invention will be apparent from the following description.

It has now been found that the conventional solutions of chlorinated phenols and chlorinated hydrocarbons in suitable volatile solvents can be greatly improved in utility as cellulose impregnants, if the composition includes a substantial portion o fa water-insoluble phosphoric acid ester. The presence of the phosphate esters provides an increased solvency for the chlorinated phenol, and retains the chlorinated phenol in a more stable form, thereby enhancing the resistance of the product to action of the destructive organisms and agencies.

The principal component of the novel compositions is a volatile solvent, which may be any one in which the critical components are soluble. These solvents may include the aliphatic hydrocarbons, such as mineral spirits, gasoline or kerosenes; the aromatic hydrocarbons, such as toluene, xylenes, methylnaphthalenes, or mixtures thereof; or chlorinated hydrocarbons such as carbon tetrachloride, ethylene dichloride, tetrachlorethane or chlorinated propanes, or a mixture of solvents of any one or more of these classes. The solvents should have a boiling point or a boiling point range between 110° C. and 220° C. and should preferably have an initial boiling point above 125° C.

The active toxicant in the novel preservative compositions is the chlorinated phenol, which has the characteristic toxicity of a phenol and stability to decomposition due to the high chlorine content. The chlorinated phenols may be phenol, cresol or similar toxic phenol having a plurality of chlorine substituents as in tetrachlorocresol and pentachlorophenol. If desired, a mixture of chlorinated hydrocarbons containing varying numbers of chlorine substituents, but preferably having an average of at least four per molecule, may be used. This chlorinated phenol may be present in the amount of 3 to 8 percent and preferably 4 to 6 percent.

A critical component in both the prior art preservatives and in the novel highly effective preservative is the chlorinated hydrocarbon. This component may be an aromatic or an aliphatic hydrocarbon containing a very high proportion of chlorine, for example in excess of 40 percent by weight of the compound and preferably in excess of 50 percent. This component is added to provide body to the solution and to improve fire retardancy. Specific compounds and mixtures of compounds as obtained by the direct chlorination of petroleum fractions are useful. Compounds which may be used include chlorinated biphenol, chlorinated terephenyl and mixtures thereof, chlorinated naphthalene and chlorinated paraffin of varying chain length and various mixtures of chlorinated hydrocarbons. The chlorinated hydrocarbons may be present from 8 to 20 percent of the weight of the solution and preferred compositions may contain from 12 to 16 percent of the highly chlorinated hydrocarbons based upon the weight of the solution.

The esters which are of exceptional utility in the improvement of the prior art solutions are the neutral esters of phosphoric acid in which each of the three organic radicals has from four (4) to eight (8) carbon atoms. Suitable examples of the phosphates which are useful in the practice of this invention are the trialkyl phosphates, including tributyl phosphate, trioctyl phosphate, trihexyl phosphate, tricyclcohexyl phosphate, tri-(2-ethylhexyl) phosphate and triamyl phosphate; the triaryl phosphates, including triphenyl phosphate, tricresyl phosphate and tribenzyl phosphate and the mixed phosphates such as octyl diphenyl phosphate, cresyl dipenyl phosphate, phenyl dicresyl posphate, butyl dioctyl phosphate and other mixed esters prepared by the esterification of phosphoric acid with mixtures of alcohols, mixtures of phenols or mixtures of alcohols and phenols having the specific number of carbon atoms and specified configurations. From 3 to 10 percent of the weight of the solution of the above described aliphatic and aromatic esters of phosphoric acid may be used. Compositions containing from 4 to 6 percent of the esters of phosphoric acid are preferred with respect to their utility in impregnating cellulosic compositions.

The valuable compositions made in accordance with this invention are preferred to be of superior water repellency and contain for this purpose from 0.1 to 2 percent of the solution and preferably from 0.2 to 0.8 percent of a petroleum wax, for example paraffin or microcrystalline wax.

Wood, wood products and fabricated cellulosic compositions, such as paper, pressed board and other compositions containing varying proportions of cellulosic derivatives, can be rendered resistant to the action of insects, weathering and fungus decomposition by applying the above described solutions by brushing, spraying or treating them under pressure and/or vacuum as is conventional in the impregnating art.

The preparation of the treated composition involves the heating of the solvent, the phosphate esters and the chlorinated phenol to effect a solution and thereafter introducing the chlorinated hydrocarbons and the petroleum wax, with agitation until a homogeneous solution is obtained.

Further details of the preparation and use of the new compositions and of their desirable physical properties are set forth with respect to the following examples.

*Example 1*

A solution was prepared by dissolving in mineral spirits 5 percent of a commercially available pentachlorophenol, 14.5 percent of a commercially available chlorinated paraffin hydrocarbon, 5 percent of a commercial cresyl diphenyl phosphate and 0.5 percent of a microcrystalline wax. A number of Swellograph test strips were treated with the above solution by dipping for 30 seconds. The samples were tested by the Standard Swellograph Method of the National Wood Products Manufacturers Association (N.W.M.A.–M–2–51). It was found to have a water repellency of 61.5 percent. When the sample was tested by the horizontal flame spread method, the average flame-out period of the treated samples was 15 seconds. The sample also was found to be nonblooming and resistant to insect and fungus attack.

*Example 2*

A cellulose treating solution comprising 5 percent of pentachlorophenol, 14 percent chlorinated terphenyl, 5 percent of cresyl diphenyl phosphate, 1 percent of paraffin wax and 75 percent of mineral spirits was prepared. When tested in the manner described in the preceding example, it was found to have a water repellency value of 68.3 and an average flame-out period of 28 seconds. The sample permanently retained sufficient pentachlorophenol to be substantially resistant to biological attack.

*Example 3*

For comparison purposes a wood sample identical to those tested in the preceding examples, except that it was treated with a solution containing only pentachlorophenol, was tested. The standard horizontal flame spread test demonstrated that the sample was flammable. A flame spread of three inches took place in 355 seconds and the sample was still flaming. (No flame-out period was measurable.) The water repellency value was found to be about zero (0) and therefore practically the same as an untreated sample.

The invention is defined by the following claims which are to be interpreted in the light of the foregoing specification.

What is claimed is:

1. Preserving, water-repellent and fire-retardant composition for cellulosic compositions consisting essentially of a solvent oil boiling between 110° C. and 220° C., from 3 to 8 percent by weight of a normally solid chlorinated phenol, from 8 to 20 percent of a normally solid chlorinated hydrocarbon containing at least 40 percent chlorine, from 3 to 10 percent of a hydrocarbon triester of phosphoric acid and from 0.1 to 2 percent of petroleum wax, the balance of said solution being the said solvent oil, all said percentages being based on the weight of the resulting solution, said solvent oil being present as the princpal component.

2. Preserving, water-repellent and fire-retardant composition for cellulosic compositions consisting essentially of a solvent oil boiling between 110° C. and 220° C., from 3 to 8 percent by weight of a normally solid chlorinated phenol, from 8 to 20 percent of a normally solid chlorinated hydrocarbon containing at least 40 percent chlorine and from 3 to 10 percent of a hydrocarbon triester of phosphoric acid, all said percentages being based on the weight of the resulting solution, said solvent oil being present as the principal component.

3. Preserving, water-repellent and fire-retardant solution for cellulosic compositions consisting essentially of a solvent oil boiling between 110° C. and 220° C., from 3 to 8 percent by weigh of a normally solid chlorinated phenol, from 8 to 20 percent of a normally solid chlorinated hydrocarbon containing at least 40 percent chlorine, from 4 to 6 percent of a hydrocarbon triester of phosphoric acid, from 0.1 to 2 percent of petroleum wax, the balance of said solution being the said solvent oil, all of said percentages being based on the weight of the resulting solution.

4. Preserving, water-repellent and fire-retardant composition for cellulosic compositions consisting essentially of a solvent oil boiling between 110° C. and 220° C., from 4 to 6 percent by weight of a normally solid chlorinated phenol, from 12 to 16 percent of a normally solid chlorinated hydrocarbon containing at least 40 percent chlorine, from 4 to 6 percent of a hydrocarbon triester of phosphoric acid and from 0.2 to 0.8 percent of petroleum wax, all of said percentages being based on the weight of the resulting solution, said solvent oil being present as the principal component.

5. Preserving, water-repellent and fire-retardant solution for cellulosic compositions consisting essentially of a solvent oil boiling between 110° C. and 220° C., from 4 to 6 percent by weight of a chlorinated phenol, from 12 to 16 percent of a normally solid chlorinated hydrocarbon containing at least 40 percent chlorine, from 4 to 6 percent of a hydrocarbon triester of phosphoric acid, the balance of said solution being the said solvent oil, all said percentages being based on the weight of the resulting solution.

6. Preserving, water-repellent and fire-retardant composition for cellulosic compositions consisting essentially of a solvent oil boiling between 110° C. and 220° C., from 3 to 8 percent by weight of pentachlorophenol, from 8 to 20 percent of a normally solid chlorinated hydrocarbon containing at least 40 percent chlorine, from 3 to 10 percent of a hydrocarbon triester of phosphoric acid and from 0.1 to 2 percent of petroleum wax, all said percentages being based on the weight of the resulting solution, said solvent oil being present as the principal component.

7. Preserving, water-repellent and fire-retardant composition for cellulosic compositions consisting essentially of a solvent oil boiling between 110° C. and 220° C., from 3 to 8 percent by weight of pentachlorophenol, from 8 to 20 percent of normally solid chlorinated paraffin containing at least 40 percent chlorine, from 3 to 10 percent of a hydrocarbon triester of phosphoric acid and from 0.1 to 2 percent of petroleum wax, all said percentages being based on the weight of the resulting solution, said solvent oil being present as the principal component.

8. Preserving, water-repellent and fire-retardant composition for cellulose compositions consisting essentially of a solvent oil boiling between 110° C. and 220° C., from 3 to 8 percent by weight of pentachlorophenol, from 8 to 20 percent of normally solid chlorinated paraffin containing at least 40 percent chlorine, from 3 to 10 percent of cresyl diphenyl phosphate and from 0.1 to 2 percent of petroleum wax, all said percentages being based on the weight of the resulting solution, said solvent oil being present as the principal component.

9. Preserving, water-repellent and fire-retardant composition for cellulosic compositions consisting essentially of a solvent oil boiling between 110° C. and 220° C., from 3 to 8 percent by weight of pentachlorophenol, from 8 to 20 percent of normally solid chlorinated paraffin containing at least 40 percent chlorine and from 3 to 10 percent of cresyl diphenyl phosphate, all said percentages being based on the weight of the resulting solution, said solvent oil being present as the principal component.

10. Preserving, water-repellent and fire-retardant composition for cellulosic compositions consisting essentially of a solvent oil boiling between 110° C. and 220° C., from 4 to 6 percent by weight of pentachlorophenol, from 12 to 16 percent of a chlorinated hydrocarbon containing at least 40 percent chlorine, from 4 to 6 percent of a hydrocarbon triester of phosphoric acid and from 0.2 to 0.8 percent of petroleum wax, all said percentages being based on the weight of the resulting solution, said solvent oil being present as the principal component.

11. Preserving, water-repellent and fire-retardant solution for cellulosic compositions consisting essentially of a solvent oil boiling between 110° C. and 220° C., from 4 to 6 percent by weight of pentachlorophenol, from 12 to 16 percent of normally solid chlorinated paraffin containing at least 40 percent chlorine, from 4 to 6 percent of a hydrocarbon triester of phosphoric acid, from 0.2 to 0.8 percent of petroleum wax, the balance of said solution being the said solvent oil, all said percentages being based on the weight of the resulting solution.

12. Preserving, water-repellent and fire-retardant composition for cellulosic compositions consisting essentially of a solvent oil boiling between 110° C. and 220° C., from 4 to 6 percent by weight of pentachlorophenol, from 12 to 16 percent of normally solid chlorinated paraffin containing at least 40 percent chlorine, from 4 to 6 percent of cresyl diphenyl phosphate and from 0.2 to 0.8 percent of petroleum wax, all of said percentages being based on the weight of the resulting solution, said solvent oil being present as the principal component.

13. Preserving, water-repellent and fire-retardant composition for cellulosic compositions consisting essentially of a solvent oil boiling between 110° C. and 220° C., from 4 to 6 percent by weight of pentachlorophenol, from 12 to 16 percent of normally solid chlorinated paraffin containing at least 40 percent chlorine and from 4 to 6 percent of cresyl diphenyl phosphate, all said percentages being based on the weight of the resulting solution, said solvent oil being present as the principal component.

14. Preserving, water-repellent and fire-retardant composition for cellulosic compositions consisting essentially of mineral spirits boiling between 110° C. and 220° C., from 4 to 6 percent by weght of a chlorinated phenol, from 12 to 16 percent of a normally solid chlorinated hydrocarbon containing at least 40 percent chlorine, from 4 to 6 percent of a hydrocarbon triester of phosphoric acid and from 0.2 to 0.8 percent of petroleum wax, all said percentages being based on the weight of the resulting solution, said mineral spirits being present as the principal component.

15. Preserving, water-repellent and fire-retardant solution for cellulosic compositions consisting essentially of mineral spirits boiling between 110° C. and 220° C., from 4 to 6 percent by weight of a normally solid chlorinated phenol, from 12 to 16 percent of a normally solid chlorinated hydrocarbon containing at least 40 percent chlorine and from 4 to 6 percent of a hydrocarbon triester of phosphoric acid, the balance of said solution being the said mineral spirits, all said percentages being based on the weight of the resulting solution.

16. Preserving, water-repellent and fire-retardant composition for cellulosic compositions consisting essentially of mineral spirits boiling between 110° C. and 220° C., from 3 to 8 percent by weight of pentachorophenol, from 8 to 20 percent of a normally solid chlorinated hydrocarbon containing at least 40 percent chlorine, from 3 to 10 percent of a hydrocarbon triester of phosphoric acid, from 0.1 to 2 percent of petroleum wax, all said percentages being based on the weight of the resulting solution, said mineral spirits being present as the principal component.

17. Preserving, water-repellent and fire-retardant composition for cellulosic compositions consisting essentially of mineral spirits boiling between 110° C. and 220° C., from 3 to 8 percent by weght of pentachlorophenol, from 8 to 20 percent of a chlorinated terphenyl containing at least 40 percent chlorine, from 3 to 10 percent of a hydrocarbon triester of phosphoric acid and from 0.1 to 2 percent of paraffin wax, all said percentages being based on the weight of the resulting solution, said mineral spirits being present as the principal component.

18. Preserving, water-repellent and fire-retardant composition for cellulosic compositions consisting essentially of mineral spirits boiling between 110° C. and 220° C., from 3 to 8 percent by weight of pentachlorophenol, from 8 to 20 percent of normally solid chlorinated paraffin containing at least 40 percent chlorine, from 3 to 10 percent of cresyl diphenyl phosphate and from 0.1 to 2 percent of microcrystalline wax, all said percentages being based on the weight of the resulting solution, said mineral spirits being present as the principal component.

19. Preserving, water-repellent and fire-retardant composition for cellulosic compositions consisting essentially of mineral spirits boiling between 110° C. and 220° C., from 3 to 8 percent by weight of pentachlorophenol, from 8 to 20 percent of normally solid chlorinated paraffin containing at least 40 percent chlorine and from 3 to 10 percent of cresyl diphenyl phosphate, all said percentages being based on the weight of the resulting solution, said mineral spirits being present as the principal component.

References Cited in the file of this patent

UNITED STATES PATENTS

| Number | Name | Date |
|---|---|---|
| 2,299,612 | Clayton et al. | Oct. 20, 1942 |
| 2,378,714 | Leatherman | June 19, 1945 |
| 2,418,843 | Leatherman | Apr. 15, 1947 |
| 2,471,638 | McCarthy | May 31, 1949 |
| 2,610,920 | Hopkinson | Sept. 16, 1952 |
| 2,634,218 | White et al. | Apr. 7, 1953 |
| 2,675,327 | Gearhart | Apr. 13, 1954 |

UNITED STATES PATENT OFFICE
CERTIFICATE OF CORRECTION

Patent No. 2,893,881                                  July 7, 1959

Songe S. Sakornbut

It is hereby certified that error appears in the printed specification of the above numbered patent requiring correction and that the said Letters Patent should read as corrected below.

Column 3, line 64, after "of a" strike out "normally solid"; lines 69 and 70, strike out ", the balance of said solution being the said solvent oil"; column 4, line 1, after "of a" strike out "normally solid"; line 11, for "weigh" read -- weight --; same line 11, after " of a" strike out "normally solid"; same column 4, line 22, after "of a" strike out "normally solid"; line 63, for "cellulose" read -- cellulosic --; column 5, line 55, for "weght" read -- weight --; column 6, line 3, after "of a" strike out -- normally solid --.

Signed and sealed this 16th day of February 1960.

(SEAL)
Attest:

KARL H. AXLINE                                               ROBERT C. WATSON
Attesting Officer                                           Commissioner of Patents